United States Patent
Reitz et al.

(10) Patent No.: US 8,540,555 B2
(45) Date of Patent: Sep. 24, 2013

(54) SUPPLY DEVICE FOR HANGING ELEMENTS

(75) Inventors: Jürgen Reitz, Eschborn (DE); Manfred Waldstädt, Mainz (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 746 days.

(21) Appl. No.: 12/716,856

(22) Filed: Mar. 3, 2010

(65) Prior Publication Data
US 2010/0240288 A1   Sep. 23, 2010

(30) Foreign Application Priority Data

Mar. 4, 2009 (DE) .......................... 10 2009 011 723

(51) Int. Cl.
*A22C 11/00* (2006.01)
(52) U.S. Cl.
USPC ............................................................ 452/46
(58) Field of Classification Search
USPC ................... 452/30–32, 35–37, 46–49, 51
See application file for complete search history.

(56) References Cited

U.S. PATENT DOCUMENTS

| | | | | |
|---|---|---|---|---|
| 3,951,262 A | * | 4/1976 | Niedecker | 206/343 |
| 4,345,411 A | | 8/1982 | Niedecker | |
| 4,694,537 A | * | 9/1987 | Kollross | 452/48 |
| 4,720,010 A | * | 1/1988 | Bertram | 206/345 |
| 5,067,313 A | * | 11/1991 | Evans | 53/576 |
| 5,100,364 A | * | 3/1992 | Kollross et al. | 452/185 |
| 5,269,116 A | * | 12/1993 | Roberts et al. | 53/138.4 |
| 5,755,022 A | * | 5/1998 | Whittlesey | 29/788 |
| 5,772,499 A | * | 6/1998 | Niedecker | 452/185 |
| 6,390,912 B1 | * | 5/2002 | Niedecker | 452/185 |
| 7,134,955 B2 | * | 11/2006 | Steinke et al. | 452/48 |
| 7,294,050 B2 | * | 11/2007 | Steinke et al. | 452/48 |
| 2008/0064313 A1 | | 3/2008 | Topfer | |

FOREIGN PATENT DOCUMENTS

| | | |
|---|---|---|
| DE | 25 29 821 C3 | 5/1978 |
| DE | 33 22 759 C1 | 11/1984 |
| DE | 10 2006 041 829 A1 | 3/2008 |
| DE | 102006054039 A1 | 5/2008 |
| EP | 0030755 A1 | 6/1981 |
| EP | 0963699 A1 | 12/1999 |

OTHER PUBLICATIONS

Webpage from Espacenet.com showing Bibliographic Data sheet for US 2008064313 (A1) dated Apr. 8, 2011.
EP0030755A1—Machine translation obtained from http://worldwide.espacenet.com on Apr. 1, 2013, 7 pages.
EP0963699A1—Machine translation obtained from http://worldwide.espacenet.com on Apr. 1, 2013, 8 pages.
DE102006054039A1—Machine translation obtained from http://worldwide.espacenet.com on Apr. 1, 2013, 9 pages.

* cited by examiner

*Primary Examiner* — Richard Price, Jr.
(74) *Attorney, Agent, or Firm* — Hahn Loeser & Parks LLP

(57) ABSTRACT

A feeding device for suspension elements, for feeding flexible suspension elements into a packaging machine, in particular into a clipping machine, wherein the suspension elements are detachably disposed in the form of loops by an adhesive on a carrier strip transversely to the feeding direction and may be conveyed of said carrier strip to a delivery point at which a suspension element may be removed from the carrier strip. In the region of the delivery point for the suspension elements, a holding-down device is provided above the carrier strip.

13 Claims, 3 Drawing Sheets

SUPPLY DEVICE FOR HANGING ELEMENTS

BACKGROUND OF THE INVENTION

The present invention relates to a feeding device for feeding suspension elements into a packaging machine.

More specifically, the invention relates to a feeding device for suspension elements, for feeding flexible suspension elements into a packaging machine, in particular into a clipping machine, wherein the suspension elements are detachably disposed in the form of loops by means of an adhesive on a carrier strip transversely to the feeding direction and may be conveyed by means of said carrier strip to a delivery point at which a suspension element may be removed from the carrier strip.

It is known, in practice, that when producing sausages, for example, the sausage meat is fed by a filling machine to a clipping machine via a filling tube. In the clipping machine, the filling material is filled into a tubular packaging material which is closed at one end by a first clip, and the tubular packaging material is closed by placing a second clip. If the sausage-shaped product or the sausage product is to be suspended for further processing, a suspension element, which in most cases is a thread loop, is usually inserted into the second clip and fixed to the sausage product by means of said second clip. The sausage products are then strung on storage rods and transported out of the clipping machine in order to be further processed, for example smoked.

A production line for producing sausage-shaped products is known from German laid-open patent specification 10 2006 041 829 (US2008064313), in which the sausage-shaped products receive a free-flowing filling material, such as sausage meat, sealing compound, granulate or the like in a tubular casing material. This prior art production line contains a clipping machine, in which the casing material stuffed with filling material is portioned into single sausage-shaped products by constricting the casing and placing closure clips in the constricted region, wherein at least one flexible suspension element that is fed in synchrony to the clipping machine may be attached to the sausage-shaped product when placing the clips. The suspension elements formed here by thread loops lie on a carrier strip which is coated on one side with an adhesive, from which they are pulled off singly in the clipping machine by a lower die, not shown in any further detail, of a clip placement and clip closing tool.

In these prior art feeding devices for flexible suspension elements there is a risk, however, that the suspension elements are ejected from the lower die or clip by the impulse that is imparted to them when they are detached from the carrier strip. This leads to the suspension elements not being properly fixed to the sausage-shaped product. Unwanted downtime and lost production are the consequence. The suspension elements twirling about can also catch in other parts of the machinery, which likewise results in additional downtime and lost production.

The object of the present invention is to provide a feeding device for suspension elements, for feeding flexible suspension elements into a packaging machine, in particular into a clipping machine, of the kind initially specified, which overcomes the aforementioned disadvantages and which makes the production of sausage-shaped products more reliable.

SUMMARY OF THE INVENTION

In order to achieve this object, a feeding device for suspension elements, for feeding flexible suspension elements into a packaging machine, in particular into a clipping machine, is proposed, in which the suspension elements are detachably disposed in the form of loops by means of an adhesive on a carrier strip transversely to the feeding direction and may be conveyed by means of said carrier strip to a delivery point at which a suspension element may be removed from the carrier strip.

In one advantageous configuration of the feeding device according to the invention, a holding-down device is provided above the carrier strip in the region of the delivery point for the suspension elements. Such a holding-down device holds the suspension element that has just been pulled off the carrier strip at least approximately as long as required until it has been fixed by means of a closure clip to the sausage-shaped product and has been carried out of the clipping zone of the clipping machine. In this way, the suspension element can be reliably prevented from twirling around and catching in other parts of the machinery.

The suspension elements fed to the clipping machine are arranged with their longitudinal extension transversely on a carrier strip and one after the another in the feeding direction. Since only the suspension element held at the delivery point is pulled off the carrier strip, another advantageous configuration of the feeding device according to the invention provides that the holding-down device contains a holding-down element which can be laid reversibly upon at least the suspension element located at the delivery point, wherein the holding-down element covers the suspension element at least in portions thereof.

In order to reliably prevent the suspension element that has just been pulled off from twirling around, the holding-down device comprises a clamping device in order to lay the holding-down element with a predetermined force onto the suspension element located at the delivery point. Said predetermined force is chosen such that it is large enough to keep the suspension element under tension, thus preventing it from twirling about, and such that the force does not exceed a maximum value in order not to prevent the suspension element from being pulled off the carrier strip.

The holding-down element may be formed in a variety of ways. In one preferred embodiment, the holding-down element comprises a flat element, for example a metal plate, preferably of stainless steel. The holding-down element may also be made of a suitable plastic.

Since the holding-down element need only cover part of the suspension element being held at the delivery point, the holding-down element may also take the form of a yoke.

In order not to prevent the suspension element from being transferred to the catching device, the holding-down element has a recess in the region of a catching device. In the event that the holding-down element is in the form of a yoke, the latter may be bent around this area in appropriate manner.

As mentioned at the outset, the suspension elements are fed to the clipping machine synchronously, that is to say any further conveying or feeding of the suspension elements occurs between two closure operations only. The suspension element held at the delivery point is pulled off the carrier strip only during a closure operation. In order not to prevent the carrier strip with the suspension elements located thereon from being advanced and in order not to damage the carrier strip and the suspension elements, it is also advantageous when the holding-down device comprises a lifting device which in one preferred configuration is in the form of a raising device for reversibly raising the holding-down element parallel to the carrier strip.

In another preferred configuration, the lifting device is in the form of a pivoting device for reversibly pivoting the holding-down element about at least one axis of the carrier strip, as a result of which the holding-down device can be further simplified.

For reversibly lifting the holding-down element, the lifting device has a drive unit which in one preferred embodiment is in the form of a pneumatic cylinder. The drive unit may be realized, of course, by an electric motor or by a hydraulic cylinder.

In order to integrate the holding-down device in the production process, it is connected to a controller, which allows the movement of the holding-down element to be adjusted very precisely to the filling or closure cycle.

A guide element is provided in order that the suspension element pulled off the carrier strip does not catch on other machinery parts, for example when the sausage-shaped products is discharged from the clipping machine.

In a clipping machine which has a displacement module comprising a first pair of displacement arms and a second pair of displacement arms arranged parallel thereto and a catching device for the suspension elements disposed downstream from the displacement module, the guide element is preferably positioned between the catching device and the lower displacement arm of what, in the direction of discharge from the filling unit, is the forward pair of displacement arms facing the catching device. The suspension element can be efficiently prevented in this way from catching on said displacement arm and from causing lost production as a result.

In order to enhance the positive effect of the guide element as described above, said guide element is spatially curved and imitates at least approximately the contour of the lower displacement arm of what in the direction of discharge from the filling unit is the forward pair of displacement arms.

In one preferred configuration of the feeding device according to the invention, the guide element is fixed to the feeding device. Its position can thus be optimally adjusted to the feeding direction and to the displacement module. However, since the guide element is a stationary component, it can also be fixed to any suitable place on the machine frame.

The suspension elements are usually thread loops. In order to prevent the suspension elements from being damaged when they are guided along the guide element, the guide element should have no sharp corners or edges. It is therefore advantageous when it has an at least approximately circular cross-section.

The guide element described above may be used in any clipping machine, of course, even when the clipping machine does not have the feeding device according to the invention.

Other advantageous configurations and an embodiment of the invention shall now be described with reference to the description of an embodiment and to the attached drawings. The terms "top", "bottom", "left" and "right" used when describing the embodiment relate to the drawings oriented in such a way that the reference signs and names of the figures can be read normally.

DETAILED DESCRIPTION OF THE INVENTION

Figure 1:
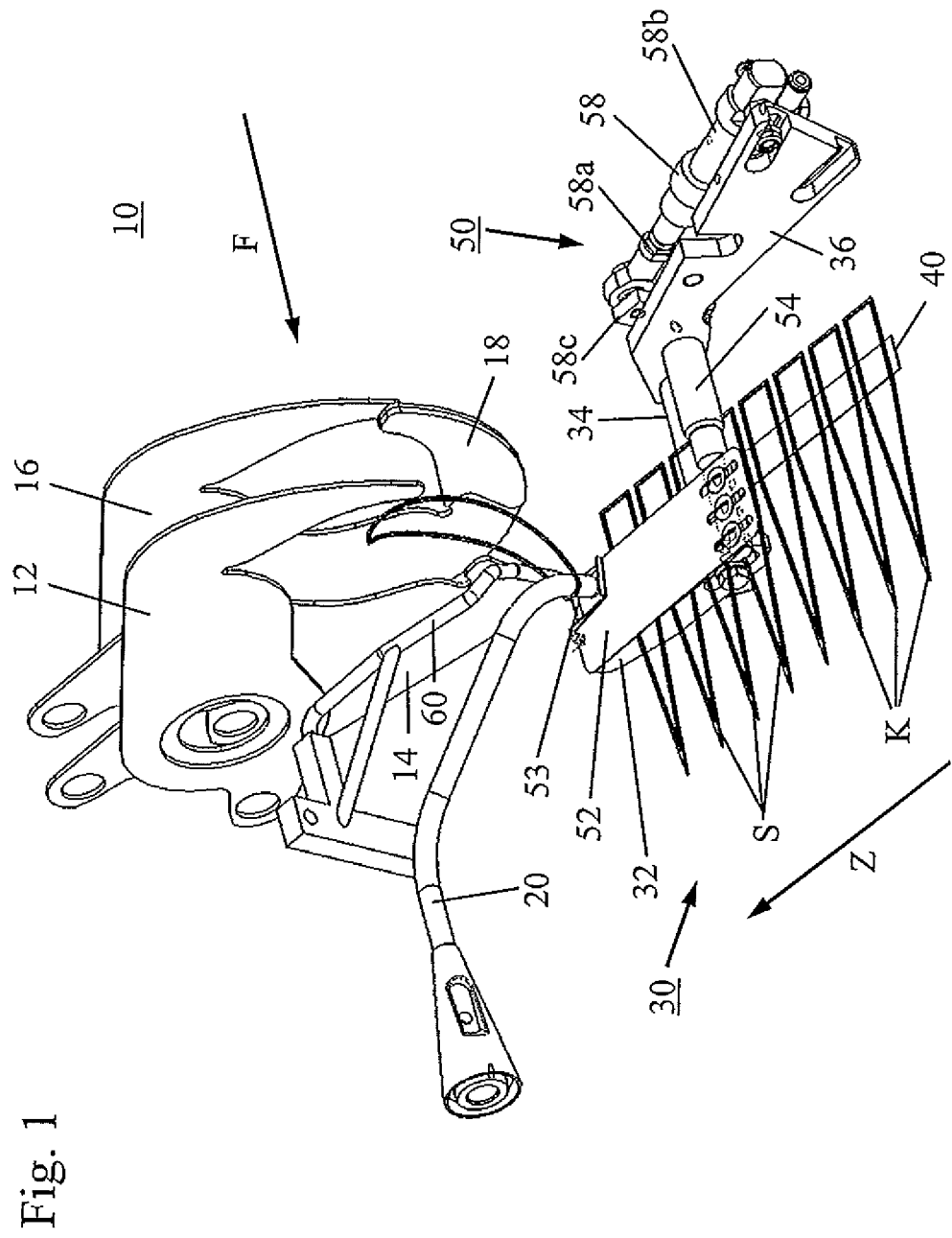
FIG. 1: shows a perspective view of the feeding machine according to the invention, in a clipping machine which is only partly shown.

FIG. 1 shows a perspective view of the inventive feeding device in a clipping machine for making sausage-shaped products, said clipping machine being known per se and only partly shown in the Figure. This prior art clipping machine has a displacement module 10 consisting of a first and a second pair of displacement arms 12, 14 and 16, 18, which are arranged parallel to each other and are reversibly pivotable about a common axis, not defined in any further detail, between a release position, as shown in FIG. 1, and a constriction position perpendicular to the direction of discharge F from the filling unit.

The clipping machine also has a catching device for the suspension elements S attachable to the sausage-shaped products or sausage products. In FIG. 1, only the catcher needle 20 of this catching device is shown. Said catching needle extends with its free end, on the right in the drawing, into the clipping zone of the clipping machine. A transport device, such as a screw conveyor, adjoins the clipping machine at one end, on the left in FIG. 1, in order to transport the sausage products held by the suspension elements, for example by thread loops S, out of the clipping machine.

FIG. 1 also shows the feeding device 30 according to the invention for feeding the suspension elements or thread loops S, to be attached to the sausage product, in feeding direction Z perpendicular to the direction of discharge F from the filling unit.

Figure 2:
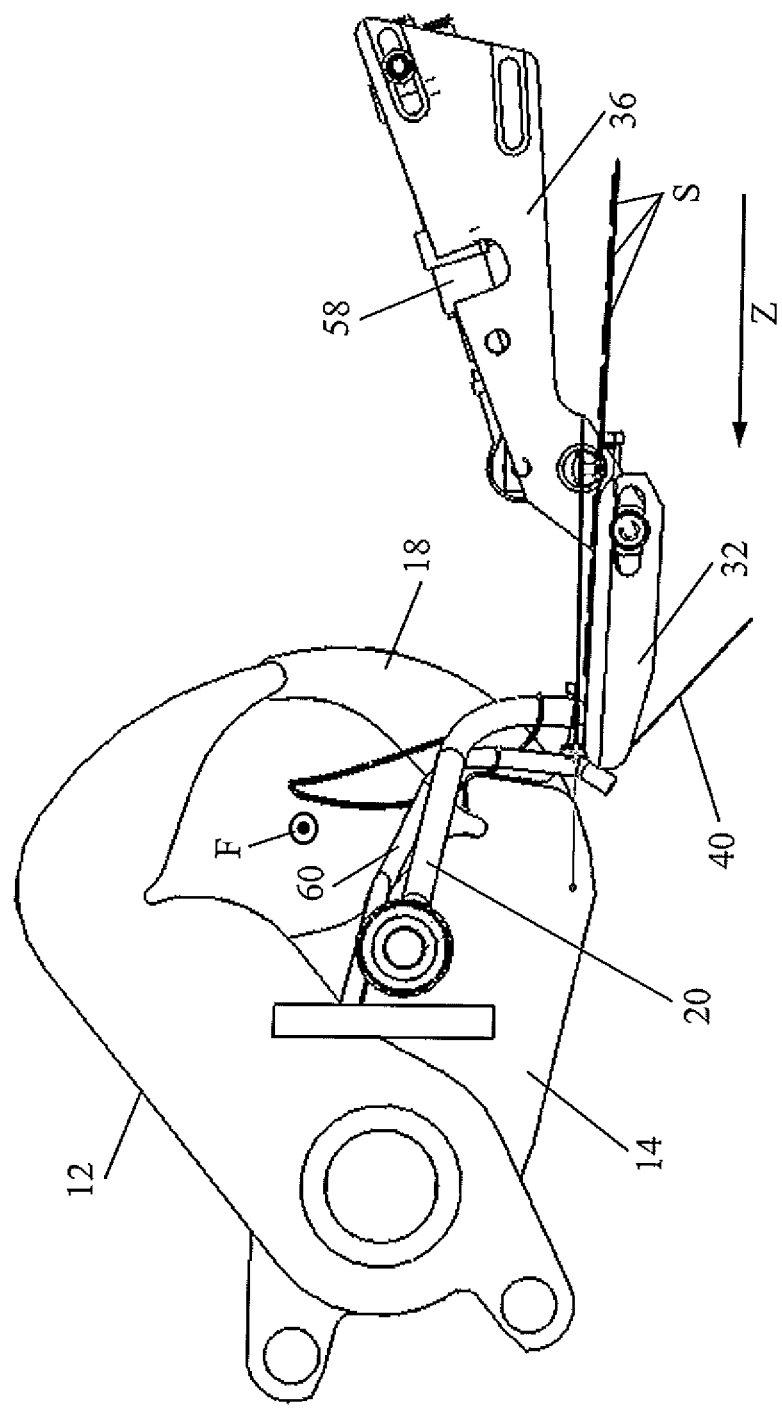
FIG. 2: shows a side elevation view of the feeding device in FIG. 1.

Feeding device 30 contains a guide element 32 which is at least approximately wedge-shaped in cross-section and which is fixed to a support 36 by means of a bolt. The thinner end of the substantially horizontally oriented guide element 32 faces in the direction of the clipping zone of the clipping machine, perpendicularly to the direction of discharge F of filling material from the filling unit. The plane of extension of the guide element 32 lies below the central longitudinal axis of the sausage products being produced, or of a filling tube, not shown, the central longitudinal axis of which runs at least approximately parallel to the direction of discharge F from the filling unit. The bolt 34, to the left-hand end of which in FIG. 1 the guide element 32 is fixed at its thicker end, likewise extends parallel to the direction of discharge F from the filling unit. The right-hand end of bolt 34 is fixed to the end of support 36 facing the clipping machine, said support being oriented approximately horizontal and perpendicular to bolt 34. As can be seen in FIG. 2, guide element 32 is fixed to bolt 34 by means of an elongate hole, which thus permits the position of guide element 32 to be adjusted.

A carrier strip 40 which carries suspension elements S is guided around guide element 32 in such a way that it lies on the upwardly facing surface of guide element 32, around the thin end of guide element 32 facing the clipping zone of the clipping machine, and finally, as can likewise be seen from FIG. 2, underneath guide element 32 and away from the clipping machine.

Suspension elements in the form of thread loops S shown schematically in FIG. 1 are disposed on the side of carrier strip 40 facing upwards in FIG. 1. The substantially oval or pear-shaped thread loops S, the longitudinal sides of which are joined by a knot K at their oval/loop end on the left in FIG. 1, are oriented with their largest longitudinal axis extending transversely to the carrier strip 40 and are arranged one after the other on said carrier strip. They lie flat on carrier strip 40 and project over both sides thereof. Thread loops S are detachably affixed to carrier strip 40 in a known manner, for example by means of an adhesive applied to carrier strip 40.

Feeding device 30 also includes a holding-down device 50 comprising a holding-down element 52, a pivot axle 54 and a pivot drive 58.

In this embodiment, the holding-down element 52 of holding-down device 50 is in the form of a flat element. The flat element, a metal plate 52 preferably made of stainless steel and substantially rectangular in shape, is oriented substantially horizontally and with its longitudinal extension in the feeding direction Z, that is to say perpendicular to the direction of discharge F from the filling unit. A recess 53 is provided in metal plate 52 at the right-hand side in FIG. 1 of its end facing towards the clipping machine and covering the delivery point at least partially. As can be seen in FIG. 1, the tip of the catcher needle 20 of the catching device, not shown in any further detail, extends to just above recess 53. In conjunction with the feeding device 30 according to the invention, the delivery point is understood to be the position of the frontmost thread loop S in the feeding direction Z, out of which the thread loop is pulled from carrier strip 40 by one of the closing tools in a manner known per se and subsequently affixed to the sausage-shaped product by means of the respective closure clip.

Metal plate 52 is connected by its end facing away from the clipping machine to pivot axle 54. Metal plate 52 is likewise joined to pivot axle 54 by means of elongate holes, which permits the position of metal plate 52 to be adjusted. The substantially cylindrical pivot axle 54 extends parallel to bolt 34 and passes through and projects beyond support 36 above the connection of bolt 34 to support 36 and offset from it in the opposite direction to the feeding direction Z of thread loops S. A bearing is formed where pivot axle 54 passes through support 36, in which pivot axle 54 is held so that it can rotate about its longitudinal axis.

A pivot drive 58 is disposed at the end of pivot axle 54 that projects out of the opposite side of support 36 from metal plate 52. In the present embodiment, pivot drive 58 is configured as a piston/cylinder drive comprising a piston 58a and a cylinder 58b and a turning lever 58c. Piston 58a and cylinder 58b are arranged parallel to support 36. The end of cylinder 58b facing away from the clipping machine is bolted to support 36. The opposite end of piston 58a is pivotably joined to a first end of turning lever 58c. The second end of turning lever 58c is stationarily disposed on the right-hand end of pivot axle 54 as shown in FIG. 1, which can thus be pivoted by means of pivot drive 58 about its longitudinal axis.

Figure 3:
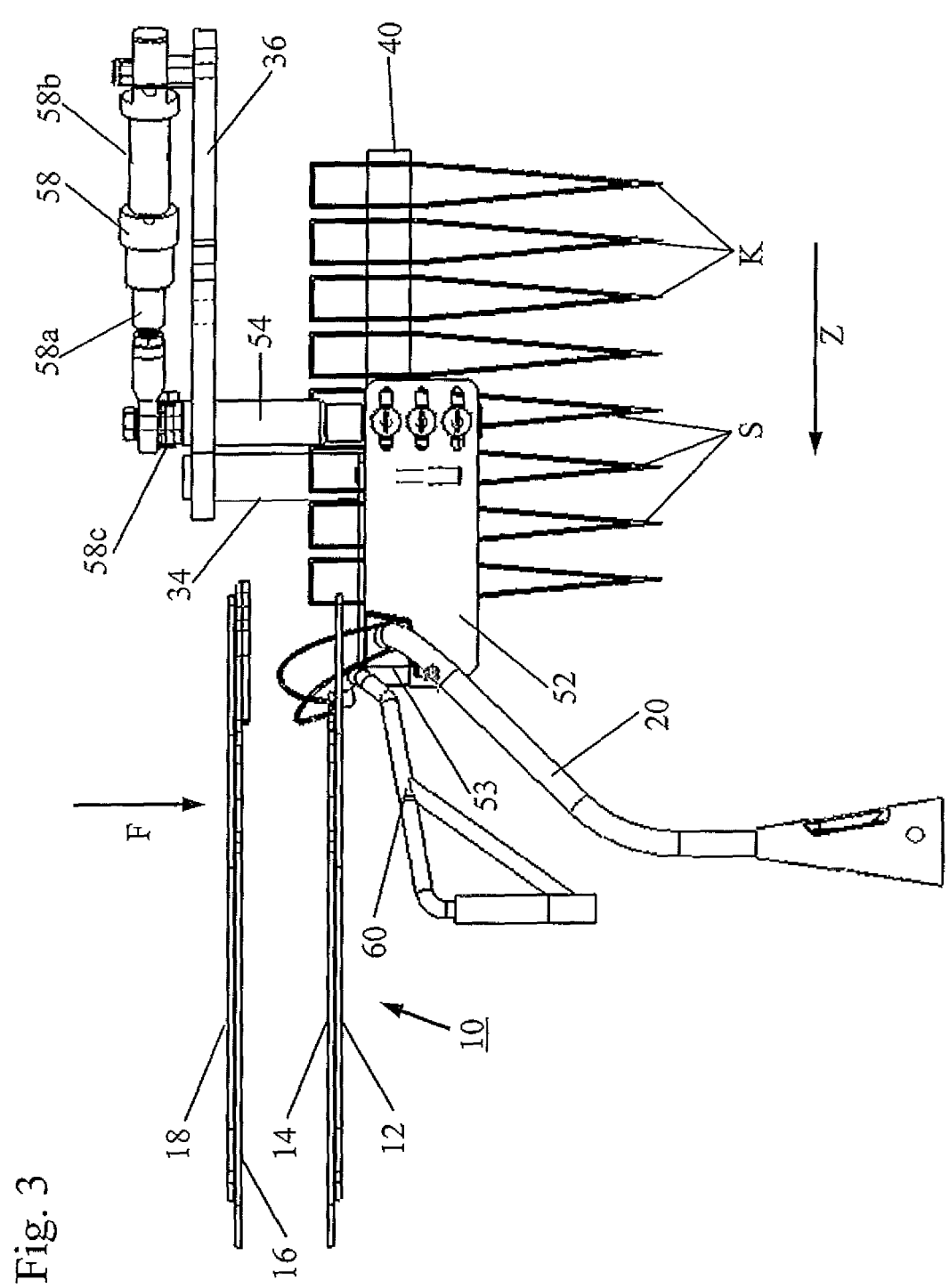
FIG. 3: shows a plan view from above of the feeding device shown in FIG. 1.

Feeding device 30 also contains a guide element 60 which is disposed in a region between the delivery point, catcher needle 20 and first displacement arms 12, 14, as can also be seen from FIGS. 2 and 3. In this embodiment, guide element 60 consists of a pipe with multiple spatial curves. It is fixedly joined at one end facing away from the delivery point to a part of the machine frame which is not shown. The free end of guide element 60 projects almost into the delivery point, but ends slightly below and to the side of it. The forward portion of guide element 60 extending into the clipping zone of the clipping machine is shaped in such a way that it roughly imitates the contour of displacement arm 14 of first displacement arms 12, 14 and projects at least slightly in the direction of feeding device 30 as well as upwards, that is to say. in the direction of the central longitudinal axis of the filling tube, which is not shown. Guide element 60 is disposed thereby in such a way that the portion thereof projecting into the clipping zone extends parallel to the first pair of displacement arms 12, 14, at least in portions, and in a perpendicularly extending plane between the first pair of displacement arm 12, 14 and the tip of catcher needle 20. The clipping zone of the clipping machine is to be understood as the region immediately around and between the pairs of displacement arms 12, 14, 16, 18 which are spread in order to form a gathered end or tip of unstuffed casing, for example.

In the production of sausages, the sausage meat is firstly conveyed in a known manner from a filling machine via a filling tube into a tubular casing to be stuffed, which is already closed at one end by means of a first clip, said casing being stored for this purpose on the filling tube and pulled from same during filling by the filling pressure. During this filling operation, displacement arms 12, 14, 16, 18 are in an open or release position, as shown in FIG. 1. When a predetermined or desired amount of sausage meat has been filled into the tubular casing, the pair of displacement arms 12, 14, 16, 18 are moved in a likewise known manner into the constriction position, that is to say the arms of each pair move radially towards each other. The pairs of displacement arms 12, 14, 16, 18 are then moved apart in the axial direction, whereupon an unstuffed tip is formed onto which, in order to close the tubular casing that has just been filled, at least one more clip is placed by radially moving the closing tools towards each other, which are usually configured as a punch and die. By its upward movement, that is to say by its movement in the direction of the tip axis, the die as lower closing tool, or the clip located in the die, inserts itself into the end of the thread loop S located at the delivery point and projecting from carrier strip 40. Thread loop S is pulled from carrier strip 40 thereby.

During this operation, metal plate 52, which has been lowered onto carrier strip 40 by means of pivot drive 58, covers thread loop S located at the delivery point at least partially, thereby exercising a predefined force on thread loop S. This predetermined force is chosen such that thread loop S may be pulled off from carrier strip 40 under tension by the die which is moved in the direction of the axis of the unstuffed tip. The thread loop S detaching itself from carrier strip 40 is thus prevented, after being detached from carrier strip 40, from twirling around under the impulse imparted to it by the removal force at the moment of detachment, and from jumping out of the die or the closure clip, or from catching on adjacent machinery parts. Metal plate 52 lies on thread loop S at least until thread loop S has been pulled from carrier strip 40 by a length equal to the width of carrier strip 40 and hence the width over which it is fixed.

After thread loop S has been completely detached from carrier strip 40 and attached to the unstuffed tip, the opposite end of thread loop S is transferred in the region of recess 53 past metal plate 52 and onto catcher needle 20. Thread loop S is now fixed with its upper end to the sausage product by means of the clip and pulled at its bottom end onto the bottom end of the catcher needle 20 of the catching device. The pairs of displacement arms 12, 14, 16, 18 and the closing tools now retract from their constricting or closure position, respectively, to their release position. The finished packaged sausage product is carried in the direction of discharge F downstream out of the clipping machine after it has been severed from the remaining supply of casing material.

When transporting the sausage product out of the clipping machine, it is moved in the direction of its central longitudinal axis, in the direction of discharge F from the filling unit, for example by means of a suitable conveyor belt. Thread loop S, the free end of which was transferred in the region of the recess 53 in the metal plate 52 onto the free end of catcher needle 20 located there, is moved in the process onto catcher needle 20 in the direction of discharge. As can be seen in FIG. 3, specifically, the front part of thread loop S, that is to say the portion facing in the direction of feeding device 30, is guided on the side of catcher needle 20 facing away from the clipping machine. The rear part of thread loop S, that is to say the portion facing towards the clipping machine, is guided through the gap between catcher needle 20 and guide element 60. Guide element 60 holds the rear part of thread loop S away from the first pair of displacement arms 12, 14, and from the lower displacement arm 14. This prevents the rear part of thread loop S from catching in the pair of displacement arms 12, 14 when the sausage product is being transported out of the clipping machine.

Once the closing tools have been moved back to their starting position, i.e. in the radial direction away from the tip axis, a new thread loop S is conveyed to the delivery point, preferably simultaneously with the next filling operation. For this purpose, metal plate 52 driven by pivot drive 58 is lifted from carrier strip 40. By advancing carrier strip 40 in feeding direction Z, the next thread loop S is then placed at the delivery point and metal plate 52 is lowered onto the latter again. Pivot drive 58 is connected to the controller of the clipping machine and can thus be adjusted optimally to the forward feed cycle for thread loops S and to the filling cycle for the sausage products.

The force with which metal plate 52 acts on carrier strip 40 and hence on the thread loop S located at the delivery point, may be predetermined by a fixed stroke of pivot drive 58 or may be freely adjustable by means of the controller connected to pivot drive 58.

As already mentioned, at least portions of metal plate 52 lie on carrier strip 40 and on thread loop S, at least in portions thereof. However, this only partial lying may also be realized by the holding-down element having the form of a yoke which lies on the thread loop S provided at the delivery point and which is bent around the position of the tip of catcher needle 20 in order to form recess 53, if necessary. In one simple configuration, the holding-down element is formed by a straight pin which lies on thread loop S in the region of the carrier strip.

As an alternative pivot drive 58, it is likewise possible to move holding-down element 52 onto carrier strip 40 by means of a linear movement. This can be realized with a piston/cylinder drive, for example, which is arranged at least approximately perpendicular over feeding device 30 and on the end of which facing feeding device 30 the respective holding-down element 52 is disposed.

In the embodiment shown, guide element 60 is made of a round material, in this case a pipe. It may equally well be made of solid material, of course. A shape deviating from a round cross-section is also conceivable, as long as it can be ensured that thread loops S are not obstructed or damaged when they move along guide element 60.

In this embodiment, guide element 60 is also mounted on a stationary part of the machine frame. It may also be attached as part of feeding device 30, of course, for example on support 36 or guide element 32.

In the embodiment shown, the lower displacement arm 14 of the first pair of displacement arms 12, 14 is shorter in design than displacement arms 12, 16, 18. As a result, thread loop S is released as soon as the opening angle of displacement arms 12, 14 is reduced. Guide element 60 is adapted to this shortened displacement arm 14. If identical displacement arms are used, meaning displacement arms of equal length, guide element 60 may also be adapted, of course, to what is then the longer displacement arm 14. In the simplest case, this can be realized by replacing guide element 60. It is likewise conceivable that that part of guide element 60 which projects into the clipping zone be provided with hinged portions in order to make individual adjustments or to permit manual readjustment.

The invention claimed is:

1. A feeding device for suspension elements, for feeding flexible suspension elements into a packaging machine including a clipping machine, comprising:
    the suspension elements being detachably disposed in the form of loops on a carrier strip transversely to a feeding direction of the packaging machine by an adhesive and may be conveyed by said carrier strip to a delivery point at which a suspension element is removed from the carrier strip; and
    a holding-down device is provided above the carrier strip in the region of the delivery point for the suspension elements;
    wherein in the region of a catching device the holding-down element has a recess for transferring the suspension element onto the catching device.

2. The feeding device of claim 1, wherein the holding-down device includes a holding-down element which is laid reversibly upon at least the suspension element located at the delivery point, wherein the holding-down element covers at least a portion of the suspension element.

3. The feeding device of claim 2, wherein the holding-down device includes a clamping device to lay the holding-down element with a predetermined force onto the suspension element located at the delivery point.

4. The feeding device of claim 2, wherein the holding-down device includes a lifting device.

5. The feeding device of claim 4, wherein the lifting device is a raising device for reversibly raising the holding-down element parallel to the carrier strip.

6. The feeding device of claim 5, wherein the lifting device has a drive.

7. The feeding device of claim 4, wherein the lifting device is a pivoting device for reversibly pivoting the holding-down element about at least one axis of the carrier strip.

8. The feeding device of claim 1, further comprising:
    a guide element for guiding the attached flexible suspension element.

9. A feeding device for feeding flexible suspension elements into a packaging machine, and into a clipping machine according to claim 8, wherein the clipping machine has a displacement module comprising a first pair of displacement arms and a second pair of displacement arms disposed parallel thereto and a catching device for the suspension elements disposed downstream from the displacement module, and wherein the guide element is positioned between the catching device and the lower displacement arm of the forward pair of displacement arms in the direction of discharge from the filling unit.

10. The feeding device of claim 9, wherein the guide element is spatially curved and replicates at least approximately the contour of the lower displacement arm of the forward pair of displacement arms in the direction of discharge from the filling unit.

11. The feeding device of claim 9, wherein the guide element is disposed on the feeding device.

12. The feeding device of claim 9, wherein the guide element is disposed on the machine frame.

13. The feeding device of claim 9, wherein the guide element has an at least approximately circular cross-section.

* * * * *